May 30, 1950   A. C. LIND   2,509,933
CLARIFICATION OF LIQUIDS
Filed March 23, 1946   2 Sheets-Sheet 1

ARTHUR C. LIND
*INVENTOR.*

BY George A. Evans
*ATTORNEY*

May 30, 1950        A. C. LIND        2,509,933
CLARIFICATION OF LIQUIDS
Filed March 23, 1946        2 Sheets-Sheet 2
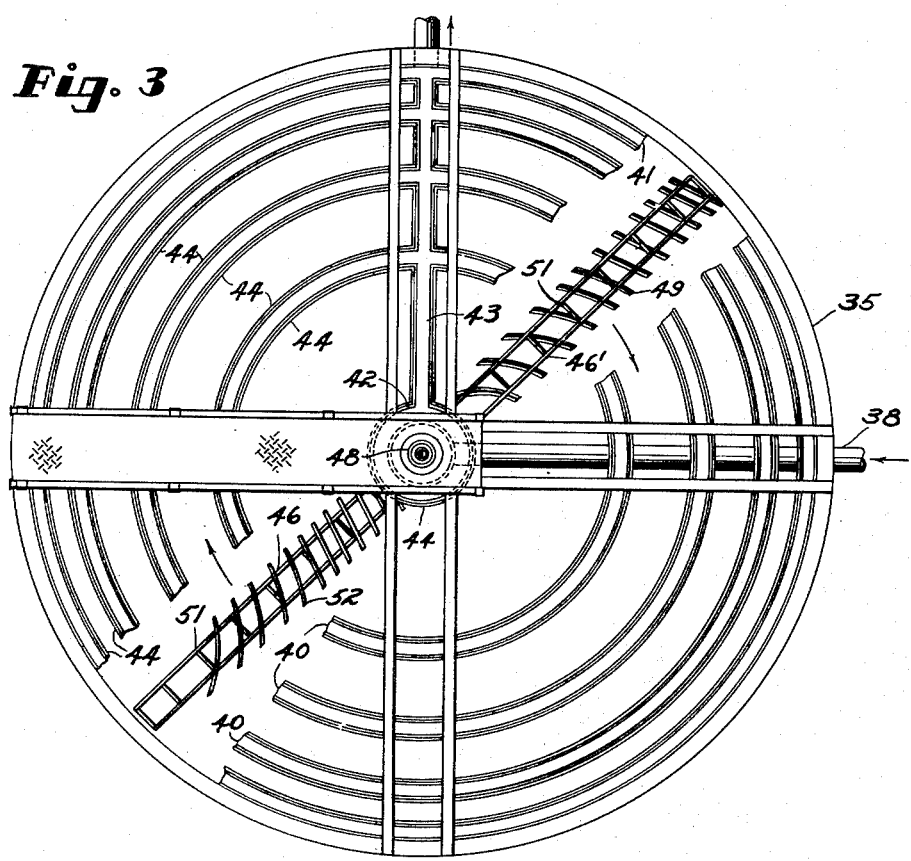
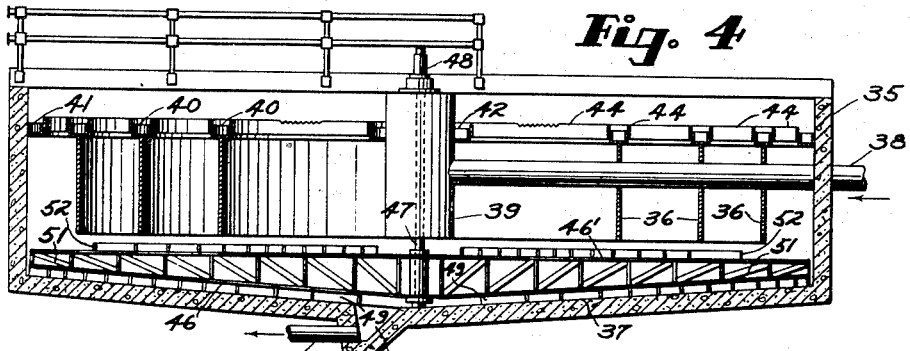
ARTHUR C. LIND
*INVENTOR.*
BY *George A. Evans*
ATTORNEY Patented May 30, 1950

2,509,933

UNITED STATES PATENT OFFICE 2,509,933

CLARIFICATION OF LIQUIDS

Arthur C. Lind, Milwaukee, Wis., assignor to Chain Belt Company, Milwaukee, Wis., a corporation of Wisconsin Application March 23, 1946, Serial No. 656,740

7 Claims. (Cl. 210—55)

This invention relates to the clarification of liquids, and has for its general object the provision of improved method and apparatus for effecting more efficient separation of liquids from solids carried in suspension therein.

Clarification by sedimentation as heretofore practiced in the art has involved the use of large basins, usually of concrete construction, in which ample time is provided for the detained liquid to deposit the major portion of those suspended solids which are capable of sedimentation. In some sedimentation basins the flow is principally horizontal, while in others, a vertical flow is produced from the lower regions of the basin to the surface of the liquid adjacent the overflow weirs. In one of its aspects, the present invention produces clarification through a novel combination of horizontal and vertical flow arrangements.

While the invention may be practiced with settling tanks of different shape and design, such as round tanks, square tanks, or rectangular tanks, it may perhaps be most advantageously practiced in tanks of rectangular shape, for reasons hereinafter pointed out.

The rectangular type of clarifying tank has come into widespread use in recent years due to the efficiency with which chain and scraper sludge collectors may be employed therewith to remove the sediment that collects on the bottom of the tank. The rectangular shape with the flow running lengthwise of the tank tends to insure a more adequate detention time than do other types of predominantly horizontal flow tanks. Construction economies also result from this type of tank, especially where two or more longitudinal channels are arranged side by side.

While rectangular settling tanks employing predominantly horizontal flow have many advantages, as pointed out above, heretofore it has been considered impossible to obtain with them some of those advantages which have been realized through the use of settling tanks in which predominantly vertical flow exists. In vertical flow tanks, particles present in the rising liquid tend to agglomerate and form flocs with the particles which are settling out, and the mass of these agglomerated solids produces a straining effect on the liquid passing through them. Sedimentation is consequently enhanced through the concurrent growth of these flocs to sizes such that they will more rapidly settle. In some instances a relatively heavy blanket of agglomerated flocs is maintained over the entire lower region of the tank and all of the incoming liquid is required to pass through this blanket before it can enter the upper region of the tank.

The present invention enables the use of the principles of such vertical flow and the maintenance of a slurry blanket, if desired, in the lower regions of a sedimentation tank which may incorporate some of the best features of design of horizontal flow tanks, and which may be provided with sedimentation removal equipment of the highly successful chain and scraper type. This is accomplished through the provision of a unique arrangement of cells which divide the tank into compartments so that each cell is separately operable to channelize flow upwardly in a substantially vertical direction. These cells cooperate with means for producing a distribution of the floc-laden liquid substantially horizontally of the tank throughout the nether regions of the various cells and hence obtain the optimum straining effects of the coagmenting particles in the liquid.

Another aspect of the invention resides in the provision of novel means for obtaining optimum detention periods and velocities in the various cells, which compensate for the fact that liquid flowing the greatest distance in a horizontal direction prior to commencing its ascension in the various cells, need not be detained as long as liquid flowing a shorter distance from the common inlet of the tank. These means are further capable of adjustment so as to minimize short circuiting within a given cell and thereby make each cell more effective as a settling compartment.

By minimizing short circuiting of the liquid, i. e., its tendency to flow in direct paths from the influent directly to the outlet, rather than being distributed throughout the entire cross sectional area of the flow-through compartment, the capacity and efficiency of the settling compartments is greatly increased, and considerable economies are effected.

For purpose of disclosure there is illustrated in the accompanying drawings forming a part of this specification, two forms of apparatus embodying the principles of the invention and illustrating the manner in which it may be practiced.

In the drawings:

Fig. 3 is a plan view with parts broken away of a round tank with modifications of the apparatus permitting the use of the invention therein;

Fig. 4 is a side elevation, taken in section, of the tank shown in Fig. 3; and

Figure 1:
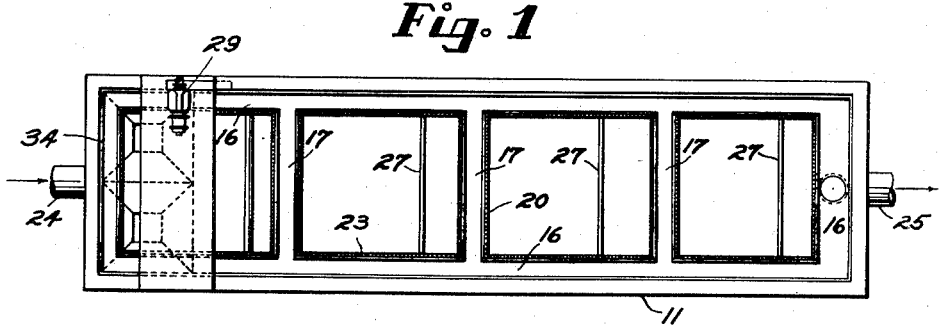
Fig. 1 is a plan view of a rectangular shaped settling tank in which the invention may be practiced.
Figure 2:
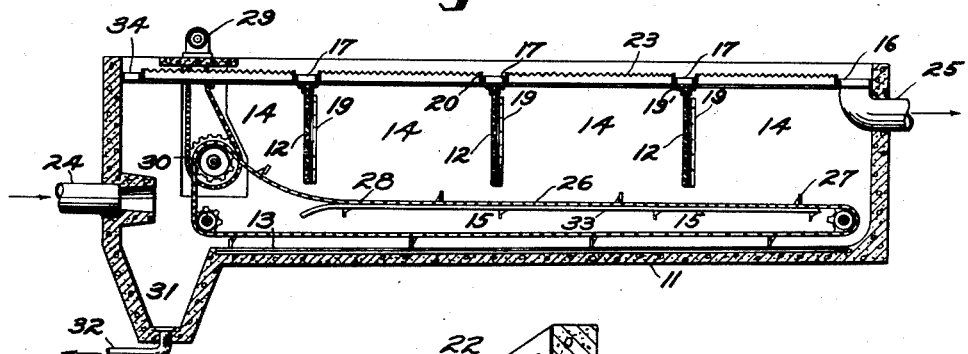
Fig. 2 is a side elevational view of the tank shown in Fig. 1, with the parts shown in section.

In the form of the embodiment shown in Figs. 1 and 2, the elongated rectangular settling tank 11 is provided with a plurality of transverse partitions 12 extending downwardly from approximately the normal liquid level to a plane spaced a distance above the bottom 13 of the tank. There partitions thus divide the chamber into a plurality of open-end vertical cells 14 which are arranged in series and communicate with each other by the spaces 15 between lower ends of the partitions 12 and the bottom of the tank. Surrounding the entire perimeter of the tank at approximately the desired liquid level is a launder 16 which is notched or cut out at intervals corresponding to the spacing of the transverse partitions 12 and communicates with troughs 17, which are arranged above each of the aforesaid partitions.

Figure 5:
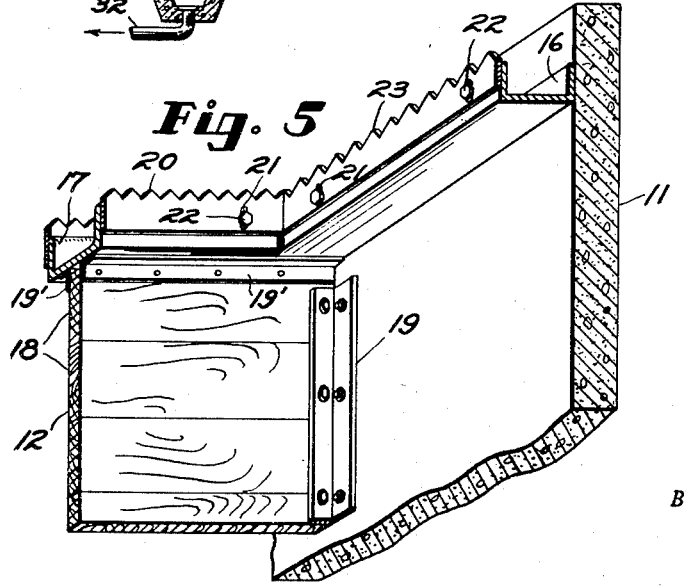
Fig. 5 is an enlarged perspective view looking upwardly at one of the corners of the cells illustrated in Figs. 1 and 2.

As best illustrated in the perspective view, Fig. 5, the partitions 12 may consist of a number of wooden planks 18 secured to vertical brackets 19 bolted or otherwise secured to the side walls of the concrete tank 11. The troughs 17 may be formed from iron channels and will be somewhat shorter than the planks 18 in order that they may abut against the side launders 16, which may also be made from steel channels bolted on the sides of the tank. Channels 17 may be welded or otherwise secured to the side launders 16. Preferably the channels 17 are spaced a slight distance above the top of the uppermost plank in order that the wood may expand, and in this event angle irons 19' are secured to the underside of the channels 17 to confine the planks and seal the space beneath the channels. Notched weir plates 20 are mounted on each side of the channel troughs 17 and oblong slots 21 cooperating with bolts 22 permit their adjustment in height and also tilting of them relative to the channel in order that the rate of flow throughout their length may be carefully regulated. Similar notched weir plates 23 are secured to the inner vertical sides of the launder 16 and these may likewise be adjusted by the slots 21 and bolts 22 associated with them.

As a result of the foregoing construction it will be clear that the rate of discharge of liquid over the various boundary portions formed by the weir plates 20 and 23 surrounding each cell may be adjusted, and as much liquid taken off at any one place as is desired. The desirability of this arrangement will be further elaborated upon as the description proceeds.

The liquid to be purified enters at a submerged level somewhat below the plane of the bottom of the partitions 12 at one end of the tank through the pipe 24 and the overflow collected in the cross channels 17 and the launders 16 is conducted away at any suitable place such as through the pipe 25 at the opposite end of the tank.

The arrangement of the partitions and weirs as hereinbefore described channelizes the liquid entering through the pipe 24 so that a portion of it flows vertically upward through each of the cells 14, and as it ascends in these cells, the countercurrent flow of the settling flocs causes intimate mingling and adhesion of the particles, thereby aiding in their precipitation or settling. As these particles build up on the floor of the tank they are removed by an endless conveyor 26 having spaced scraper flights 27, the ends of which are secured to parallel strands of chain 28. The conveyer chains are driven through a suitable chain and sprocket drive 30 by a motor 29 mounted on top of one side of the tank.

The lower run of the conveyer is arranged to draw the flights 27 along the surface of the floor 13 toward the inlet end of the tank, i. e., from right to left as viewed in Fig. 2, and the settled sludge is thus scraped to a sump 31 at the inlet end from whence it may be removed through a pipe 32.

On its upper run the chains 28 are supported by guide rails 33 arranged so that the flights which are vertical at this time just clear the bottoms of the partitions 12 as they travel parallel to the flow from the inlet end of the tank. This arrangement of the flights is effective in producing a distribution of the settled particles throughout the entire lower portion of the tank and produces nearly uniform straining effect in the entrance zone of the various cellular compartments.

With the apparatus illustrated in Fig. 1, there is a tendency for the liquid as it enters the tank to rise directly in the cell which communicates with the inlet pipe and progressively for less liquid to flow through the cells 14 as they become more remote from the inlet. To compensate for the greater difference in length of travel to the outlet points of the various cells, the weir plates surrounding the more proximate cells are elevated in a progressive manner and because of the hydraulic head which is thus produced, flow is forced at a greater rate through the more remote cells.

In the individual cells there is also a tendency for short circuiting; for instance referring again to the cell shown at the extreme left in Fig. 2, that side of the cell which is bounded by the launder 34 at the end of the tank will normally receive more discharge due to its greater proximity to the inlet than the weir which surmounts the partition dividing the first cell from the second cell in the series. Accordingly the weir plate which is secured to the end launder 34 is slightly elevated with respect to the weir plate on the opposite side of the cell and the weir plates on the side launders are tilted with their higher ends matching in height the height of the weir plate secured to the end launder.

Similar adjustments may be made with respect to the weir plates surrounding each of the other cells in the tank, and since the cells are connected in series, each cell will present substantially the same problem, for the liquid as it passes under the partitions 12 will tend to short circuit upwardly to the cross weir which is mounted on that partition. The provision of the adjustable weir plates as herein set forth provides a most efficient means of compensating for the difference in flow paths to the outlets surrounding each of the cells.

The distribution of the flocs at the mouths of the various cells is also enhanced by the regulation of the velocities in the different cells, for by increasing the velocity to the latter cells in the series, the flocs are transported under the partitions 12 by the current which then cooperates with the conveying means previously described.

The invention may also be practiced in a circular tank 35, as illustrated in Figs. 3 and 4. Here the up-flow zones are provided by a plurality of concentric partitions 36 suitably spaced from the floor 37 of the tank. The raw liquid enters the tank through a pipe 38 which communicates with a central vertical feed conduit 39 discharging at a level below that of the bottom of the partitions 36. Mounted on each of the partitions is an annular trough or channel 40 and surrounding the perimeter of the tank and also surrounding the feed conduit 39 are effluent launders 41 and 42 respectively, which communicate with each other and with the troughs 40 by a radial trough 43. Adjustable weir plates 44 are mounted on either side of the troughs and at the inner and outer sides of the launders 41 and 42 respectively. It will be apparent that the plates 44 may be mounted in a similar manner as the weir plates 20 and 23 described in connection with the apparatus shown in other figures of the drawings.

The sludge which settles to the floor 37 is scraped to a sump 45 near the center of the tank by a rotating mechanism comprising arms 46 carried by a vertical shaft 47 driven by a motor 48. The arms 46 and 46' are provided with blades 49 which engage the floor and are arranged to move the sludge inwardly from the peripheral portions of the floor to the sump 45, from whence it is withdrawn through a pipe 50. Supported by a latticework 51 on the arms 46 at a level just below the bottom of the partitions 36 are a plurality of blades 52, which are pitched in an opposite direction to the blades 49 that scrape the bottom of the tank.

In Fig. 3 of the drawings, the arm 46 is shown with only the blades 52 mounted on it, and the arm 46' is shown with only the scraper blades 49 mounted on it. Obviously each arm may be equipped with both sets of blades, but the illustration shown in Fig. 3 is intended to bring out the differences in the arrangements of the blades 49 and 52.

The effect of the blades 52 is to distribute such particles as may be in their path from the central zone of the tank in which they are most concentrated and through which the liquid must flow as it rises in the innermost cell, to the more removed zones of the tank at the entrance to the outer cells. In this respect the blades 52 serve an analogous function to the flights on the conveyer 26 shown in the other embodiment of the invention, in that they both move the particles in their paths from the area of the higher concentration toward areas of lower concentration, whereas the sludge on the floors of the respective tanks is moved in an opposite direction toward, rather than away from the point of introduction of the liquid into the settling compartment.

It will be observed with the apparatus shown in Figs. 3 and 4 that the radial distance between the partitions 36 is progressively decreased from the center outwardly in order that each of the zones between the partitions may be of substantially the same volume. By making the weir plates adjustable it is again possible to compensate for the increased distance of travel between the inner periphery and the outer periphery of each cell and accordingly to elevate the weir at the inner periphery to avoid short circuiting in the cell.

The present application is a continuation-in-part of my copending application Serial No. 550,844 filed August 23, 1944, now abandoned.

Although the invention has been described in connection with specific embodiments thereof, its scope should be determined by the appended claims which are not to be limited beyond their clear import.

What is claimed is:

1. In a clarification of liquids, the method which comprises continuously introducing a stream of solids-carrying liquid into the lower portion of a confined body of the liquid; channelizing the liquid into vertical zones throughout the upper portion of the liquid body, whereby horizontal distribution of the incoming liquid occurs only in the lower portion of the body and movement thereabove takes place only in substantially vertical directions; continuously discharging the entire effluent over the upper boundaries of the several zones; adjusting the rate of discharge from the various boundary portions of each zone with respect to one another and with respect to the boundary portions of the other zones, to compensate for the differences in the length of travel of the liquid from the point of introduction to the various discharge points; and removing deposited sludge from the body of liquid.

2. In the clarification of liquids, the method which comprises continuously discharging a stream of solids-carrying liquid into the lower portion of a confined body of the liquid; channelizing the liquid into vertical zones throughout the upper portions of the liquid body, whereby horizontal distribution of the incoming liquid occurs only in the lower portion of said body and movement thereabove takes place only in substantially vertical directions; distributing the solids settling in the several zones substantially uniformly in said lower body portion at the entrances to the zones, whereby to secure a substantially uniform straining effect on the liquid entering the zones; continuously discharging the entire effluent over the upper boundaries of the several zones; adjusting the rate of discharge from the various boundary portions of the zones in proportion to the distance traveled by the liquid from the inlet to the respective discharge points; and removing the deposited sludge from the body of liquid.

3. Apparatus for clarifying liquids, comprising a sedimentation tank having an inlet discharging into the lower portion of the tank; spaced vertical partitions disposed throughout the entire upper portion of the tank, providing a plurality of substantially vertical cells throughout said upper tank portion, whereby horizontal distribution of the incoming liquid will occur only in the lower portion of the tank and liquid movement thereabove will take place only in substantially vertical directions; discharge conduits extending along the upper boundaries of each of the several cells for receiving and discharging the entire effluent, the conduits of each cell having independently adjustable intake portions, individual adjustment of which compensates for the difference in the length of travel of the liquid from the inlet to the various discharge conduits; and means for removing sludge deposited on the bottom of the tank.

4. Apparatus for clarifying liquids containing settleable solids, comprising a sedimentation tank having an inlet in the lower portion thereof; vertical partitions spaced throughout the upper portion of the tank and dividing the entire such portion into a plurality of substantially vertical cells, whereby horizontal distribution of the incoming liquid will occur only in the lower portion of the tank and liquid movement thereabove will take place only in substantially vertical directions; discharge conduits surrounding the upper boundaries of the several cells for receiving and discharging the entire effluent, the conduits surrounding each cell having independently adjustable intake portions, individual adjustment of which compensates for the difference in the length of travel of the liquid from the inlet to the various discharge conduits; a conveyer disposed below the several cells and traversable across the mouths thereof to distribute the settleable solids at the mouth of each cell, whereby to produce a straining effect on the liquid flowing through the cells; and means for removing settled sludge from the bottom of the tank.

5. Apparatus for clarifying liquids, comprising a sedimentation tank having an inlet discharging into the lower portion of the tank; means providing a plurality of substantially vertical cells throughout the upper portion of said tank, whereby horizontal distribution of the incoming liquid may occur only in the lower portion of the tank and liquid movement thereabove may take place only in substantially vertical directions; discharge receiving means at the upper boundaries of the various cells for discharging the entire effluent; weirs arranged at the boundaries of each cell; means for adjusting the height of the weirs to compensate for the differences in length of travel of the liquid from the inlet to the various weirs; an endless flight conveyer in the lower portion of the tank having a lower run disposed for travel along the floor of the tank to scrape solids settling thereon to a removal point, said conveyer having an upper run disposed for travel in proximity to said cells, thereby distributing the solids settling in the several cells substantially uniformly at the entrances to the cells to produce straining effects on the liquid passing therethrough; and means for withdrawing from the tank settled solids collected at the removal point.

6. Apparatus for clarifying liquids, comprising a rectangular sedimentation tank having an inlet discharging into the lower portion of the tank; partitions spaced throughout the entire upper portion of the tank to divide such portion into a plurality of substantially vertical cells, whereby horizontal distribution of the incoming liquid will occur only in the lower portion of the tank and liquid movement thereabove will take place only in substantially vertical directions; discharge conduits along the upper boundaries of the several cells for receiving and discharging the entire effluent; a vertically adjustable weir extending along each boundary of each cell adjacent the discharge conduit thereof, said weirs being individually adjustable to control the flow of liquid from the cells to the conduits, whereby to compensate for the difference in the length of travel of the liquid from the inlet to the various weirs; and means for removing sludge deposited on the bottom of the tank.

7. Apparatus for clarifying liquids, comprising a substantially circular sedimentation tank having a central inlet discharging into the lower portion of the tank; partitions dividing the tank into a plurality of substantially vertical, concentric cells throughout the upper portion of said tank, whereby horizontal distribution of the incoming liquid may occur only in the lower portion of the tank and liquid movement thereabove may take place only in substantially vertical directions; annular troughs at the upper boundaries of the various cells for discharging the entire effluent; weirs arranged at the boundaries of each cell; means for adjusting the height of the weirs to decrease the height and thereby compensate for increase in length of travel of the liquid from the inlet to the more remote weirs; and means for removing sludge deposited on the bottom of the tank.

ARTHUR C. LIND.

REFERENCES CITED

The following references are of record in the file of this patent:

UNITED STATES PATENTS

| Number | Name | Date |
|---|---|---|
| 976,923 | Rothwell | Nov. 29, 1910 |
| 1,708,021 | Lenz et al. | Apr. 9, 1929 |
| 1,733,324 | Wetherbee | Oct. 29, 1929 |
| 2,051,149 | Nordell | Aug. 18, 1936 |
| 2,110,462 | Coberly | Mar. 8, 1938 |
| 2,137,421 | Tark | Nov. 22, 1938 |
| 2,160,838 | Dorr | June 6, 1939 |
| 2,264,139 | Montgomery et al. | Nov. 25, 1941 |
| 2,347,318 | Gurney | Apr. 25, 1944 |
| 2,427,092 | Kamp | Sept. 9, 1947 |
| 2,428,756 | Lind | Oct. 7, 1947 |
| 2,441,200 | Langhurst | May 11, 1948 |

FOREIGN PATENTS

| Number | Country | Date |
|---|---|---|
| 13,433 of 1911 | Great Britain | June 6, 1912 |
| 421,266 | Germany | Nov. 12, 1925 |